(12) United States Patent
Chandrasekar et al.

(10) Patent No.: US 8,191,004 B2
(45) Date of Patent: May 29, 2012

(54) USER FEEDBACK CORRELATED TO SPECIFIC USER INTERFACE OR APPLICATION FEATURES

(75) Inventors: Raman Chandrasekar, Seattle, WA (US); Dean A. Slawson, Beijing (CN); Matthew R. Scott, Beijing (CN); Dharmarajan Ratnagiri Ayakkad, Maharashtra (IN); Daniel Makoski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 657 days.

(21) Appl. No.: 12/186,521

(22) Filed: Aug. 6, 2008

(65) Prior Publication Data
US 2010/0037166 A1 Feb. 11, 2010

(51) Int. Cl.
*G06F 3/048* (2006.01)

(52) U.S. Cl. ........ 715/769; 715/701; 715/705; 715/708; 715/710; 715/772

(58) Field of Classification Search .................. 715/701, 715/705, 708, 710, 772
See application file for complete search history.

(56) References Cited

U.S. PATENT DOCUMENTS

| | | | |
|---|---|---|---|
| 5,537,618 A * | 7/1996 | Boulton et al. ............... | 715/745 |
| 6,970,860 B1 | 11/2005 | Liu et al. | |
| 7,003,513 B2 | 2/2006 | Geiselhart et al. | |
| 7,117,207 B1 | 10/2006 | Kerschberg et al. | |
| 7,181,696 B2 * | 2/2007 | Brock ........................... | 715/758 |
| 7,216,121 B2 | 5/2007 | Bachman et al. | |
| 7,478,121 B1 * | 1/2009 | Nickerson et al. ............ | 709/203 |
| 7,756,970 B2 * | 7/2010 | Ebert et al. .................... | 709/224 |
| 7,814,029 B1 * | 10/2010 | Siegel ........................... | 705/347 |
| 7,827,487 B1 * | 11/2010 | Nickerson et al. ............ | 715/711 |
| 7,937,340 B2 * | 5/2011 | Hurst-Hiller et al. .......... | 706/14 |
| 2003/0028393 A1 * | 2/2003 | Coulston et al. ................. | 705/1 |
| 2003/0085927 A1 * | 5/2003 | Muller .......................... | 345/810 |
| 2004/0169678 A1 * | 9/2004 | Oliver ........................... | 345/738 |
| 2005/0076093 A1 | 4/2005 | Michelitsch et al. | |
| 2005/0102622 A1 * | 5/2005 | Carroll et al. ................. | 715/705 |
| 2005/0125382 A1 | 6/2005 | Karnawat et al. | |
| 2005/0251437 A1 | 11/2005 | Meuleman et al. | |
| 2006/0048042 A1 | 3/2006 | Sembower et al. | |
| 2006/0248057 A1 | 11/2006 | Jacobs et al. | |
| 2006/0253800 A1 * | 11/2006 | Jones et al. ................... | 715/810 |
| 2007/0067279 A1 | 3/2007 | Bonabeau et al. | |
| 2007/0192163 A1 * | 8/2007 | Barr ............................... | 705/10 |
| 2009/0171771 A1 * | 7/2009 | Carden et al. .................. | 705/11 |
| 2009/0317060 A1 * | 12/2009 | Han et al. ....................... | 386/95 |
| 2010/0180202 A1 * | 7/2010 | Del Valle Lopez ........... | 715/728 |

OTHER PUBLICATIONS

BreBru.com "Decoding the Windows 95/Windows 98 Desktop" Nov. 13, 2006, pp. 1-6 http://web.archive.org/web/20061113210918/http://brebru.com/windows_decoding_the_desktop.html.*

(Continued)

*Primary Examiner* — Stephen Hong
*Assistant Examiner* — Mario M Velez-Lopez
(74) *Attorney, Agent, or Firm* — Westman, Champlin & Kelly, P.A.

(57) ABSTRACT

A user interface display for software has a user satisfaction portion displayed on each page. The user satisfaction portion includes a user selectable element which allows a user to provide a user satisfaction score (or level) with a single mouse click. In response to receiving the user satisfaction level, the context of the software which the user is using is recorded, and the user satisfaction level is correlated to that context. The captured data can be provided to application designers and developers directly or via computed metrics.

17 Claims, 10 Drawing Sheets

OTHER PUBLICATIONS

Understanding and Using Context, Anind K. Dey, Feb. 2001, Personal and Ubiquitous Computing Journal, vol. 5, pp. 1-4 http://dl.acm.org/citation.cfm?id=593572.*

Salton, et al., "Improving Retrieval Performance by Relevance Feedback", Journal of the American Society for Information Science, Jun. 1990, pp. 288-297.

White, et al., "Comparing Explicit and Implicit Feedback Techniques for Web Retrieval: TREC-10 Interactive Track Report", Proceedings of the Tenth Text REtrieval Conference, Date: 2001, pp. 1-5.

"Learning Retrieval Functions from Implicit Feedback" Retrieved on Feb. 6, 2008. http:/www.cs.cornell.edu.People/tj/carreer. 4 pages.

\* cited by examiner

Thanks, keep your feedback coming! 280

FIG. 6

USER FEEDBACK CORRELATED TO SPECIFIC USER INTERFACE OR APPLICATION FEATURES

BACKGROUND

User feedback is currently an important mechanism by which developers of software improve the experiences of the user's who use the software. For instance, if a user provides feedback indicating that the user experience is unsatisfactory, a developer may undertake changes to the application in an effort to improve the experience of the users using the application.

Some current software systems allow a user to provide feedback. However, the user must often navigate away from a current display, and enter a specialized user feedback display. The user feedback display then dominates the user's screen and requires the user to input a fairly onerous amount of information into a user feedback form. The user must then submit the form, and only then can the user return to the application display that the user was previously viewing. This is a fairly cumbersome mechanism for receiving user feedback. Therefore, many users do not provide any feedback, whatsoever. They simply have a satisfactory user experience, or an unsatisfactory user experience, and they return to the software systems on which they have had satisfactory experiences, and tend to stay away from those systems where they have unsatisfactory experiences.

It is also currently very difficult to provide a mechanism for receiving user feedback on subtle features of a user interface. For example, if a developer changes a user interface page layout, or color, of if the developer changes the features available on a given user interface page, it is difficult to tell how the users are perceiving those changes. For instance, many user feedback mechanisms allow the user to rate an overall product, but not to rate a specific screen or user interface display. Therefore, if the user rates the product relatively low, the developer is left wondering whether it was the user interface features, the layout of the page, the function of the application, etc., which left the user with an unsatisfactory experience. Similarly, if the user rates the application relatively high, the developer is in no better position to determine precisely what parts of the application the user enjoyed.

The discussion above is merely provided for general background information and is not intended to be used as an aid in determining the scope of the claimed subject matter.

SUMMARY

A user interface display for software has a user satisfaction portion displayed on each page. The user satisfaction portion includes a user selectable element which allows a user to provide a user satisfaction score (or level) with a single mouse click. In response to receiving the user satisfaction level, the context of the software which the user is using is recorded, and the user satisfaction level is correlated to that context.

The captured data can be displayed to application designers and developers directly or via computed metrics. Also, the user can optionally provide additional information, including query type and other explicit feedback. The additional information can also be captured in metrics.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 4-6 show illustrative embodiments of displays which can be generated on the user satisfaction display area shown in FIG. 3B.

DETAILED DESCRIPTION

Figure 1:
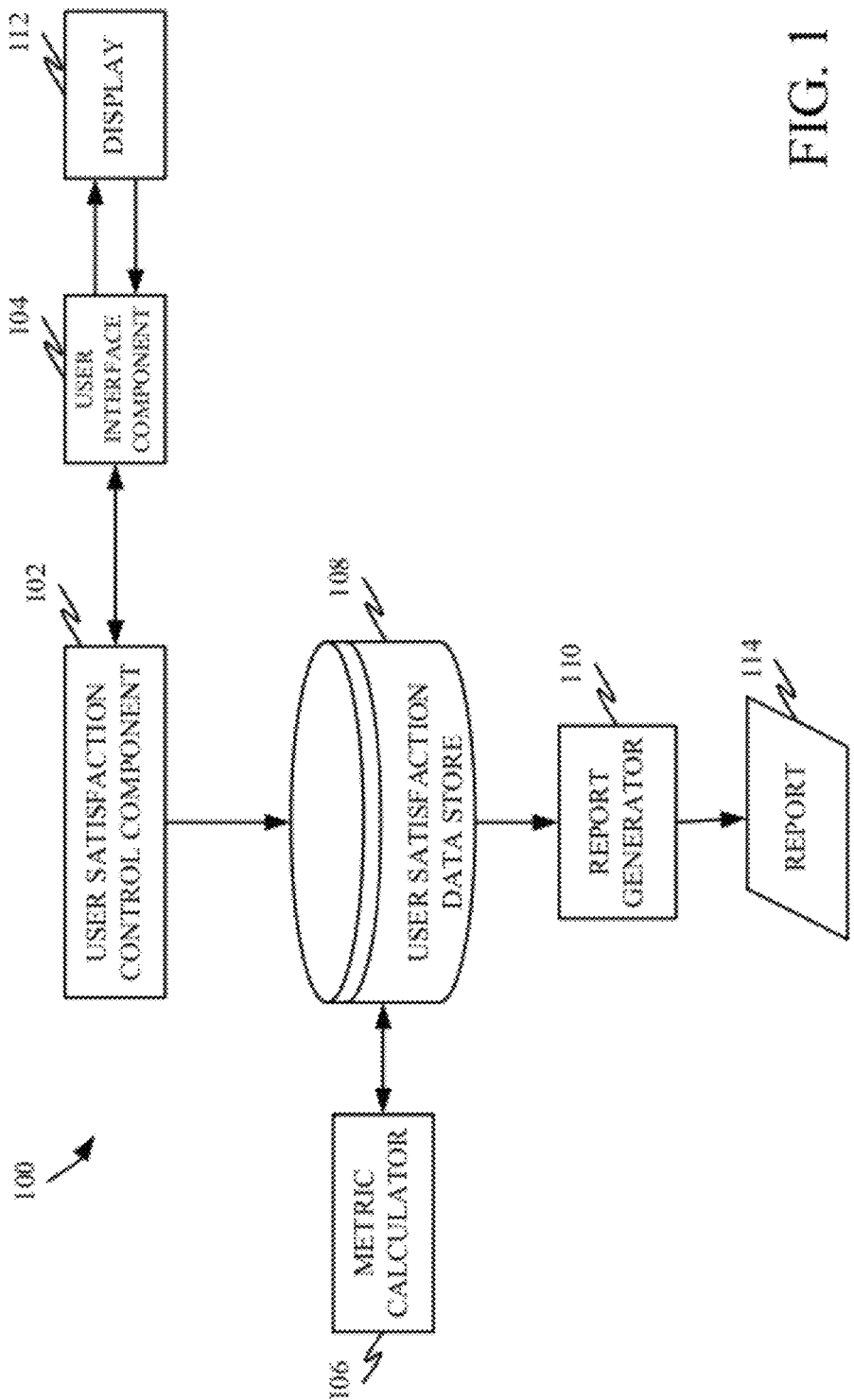
FIG. 1 is a block diagram of one illustrative embodiment of a user satisfaction scoring system.
Figure 2:
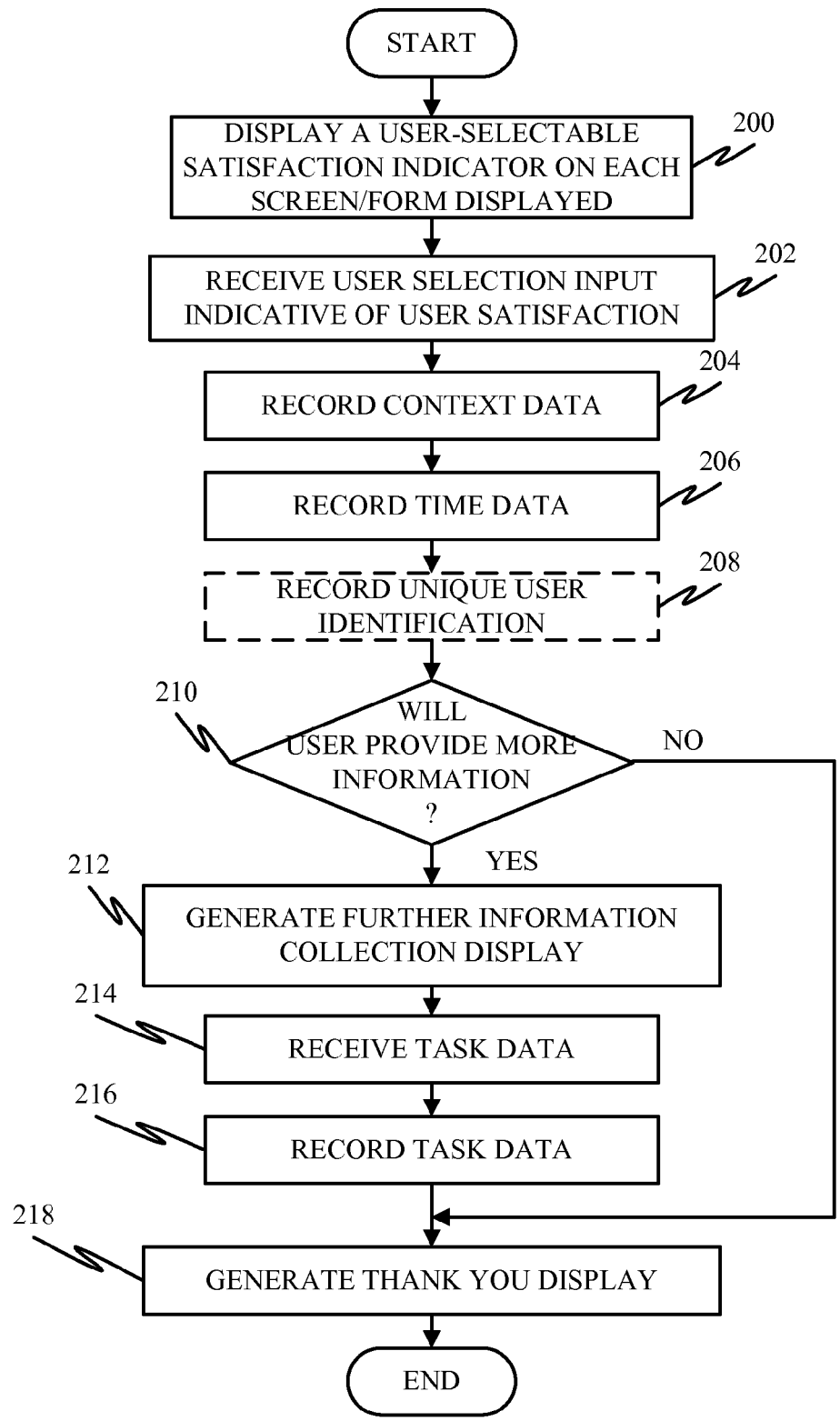
FIG. 2 is a flow diagram illustrating one embodiment of the overall operation of obtaining a user satisfaction score in the system shown in FIG. 1.

FIG. 1 is a block diagram of one illustrative embodiment of a user satisfaction measurement system 100. System 100 illustratively includes user satisfaction control component 102, user interface component 104, metric calculator 106, user satisfaction data store 108 and report generator 110. FIG. 1 also shows that user interface component 104 illustratively generates a display 112, and report generator 110 generates reports, such as report 114. FIG. 2 is a flow diagram illustrating the overall operation of system 100 shown in FIG. 1, in generating user satisfaction measurements for a given application.

In one embodiment, user satisfaction control component 102 illustratively causes user interface component 104 to generate display 112 with a user-selectable satisfaction indicator on each screen (or form) displayed on display 112. This is indicated by block 200 in FIG. 2. In one embodiment, the user-selectable satisfaction indicator is always present on the user interface display so that, no matter where a user is in an application or software system, the user can easily provide user satisfaction feedback by invoking features of the user-selectable satisfaction indicator.

Figure 3A:
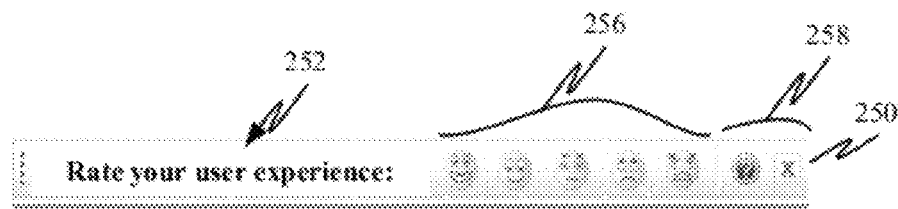
FIG. 3A is one embodiment of a user-selectable satisfaction indicator that can be displayed on a display screen.

FIG. 3A is one exemplary screenshot of a user satisfaction indicator 250. It can be seen in FIG. 3A that indicator 250 illustratively includes a textual description 252 such as "Rate your user experience". That textual description 252 is then followed by a plurality of user-selectable elements 256 that range from very satisfied to very unsatisfied. In the embodiment shown in FIG. 3A, selectable elements 256 are a range of face icons that vary between a widely smiling face icon on the left and a sternly frowning icon on the right. When the user clicks on one of the icons, this indicates the level of user satisfaction that the user is currently experiencing.

Figure 3B:
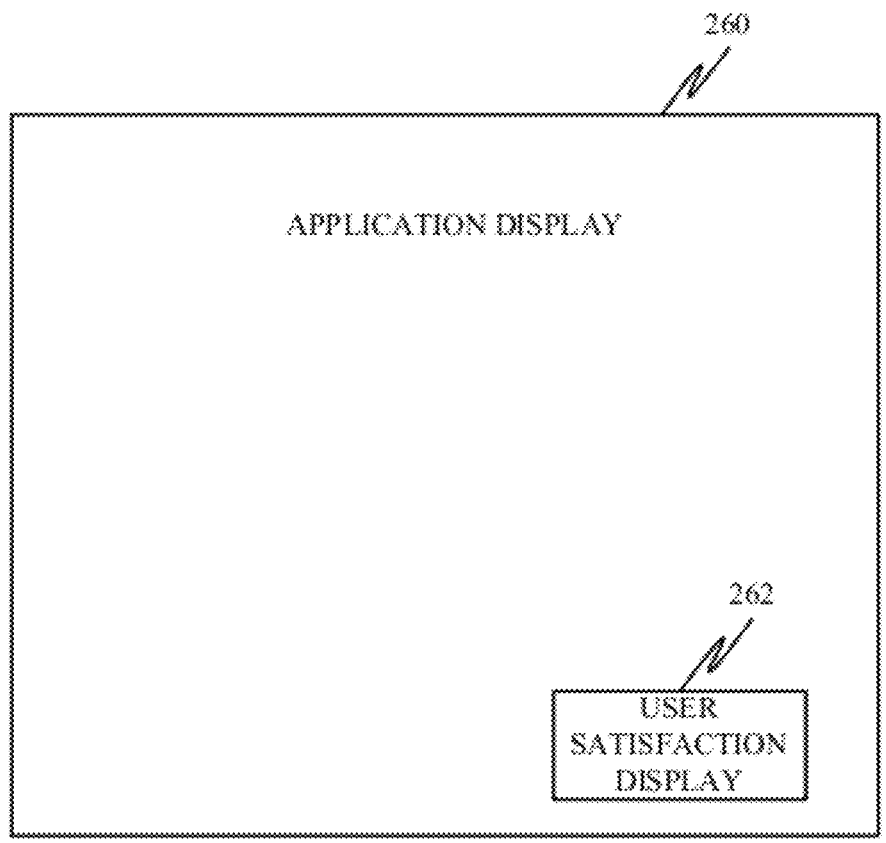
FIG. 3B shows one embodiment in which the user-selectable satisfaction indicator is displayed in a user satisfaction display area of an application display area.

FIG. 3B shows that, in one embodiment, an application or other software system generates a display such as an application display on display area 260. FIG. 3B also shows that, in one illustrative embodiment, the user-selectable satisfaction indicator 250 is constantly displayed in a user satisfaction display area 262. Of course, in one embodiment, the user can drag and drop the user satisfaction display area 262 to any desired location on display 260, and that shown in the lower right hand corner of FIG. 3B is exemplary only. Also, as shown in FIG. 3A, the user may engage one of two additional control elements 258, which allow the user to close the user-selectable satisfaction indicator 250, or receive a further explanation as to how it is used.

In any case, in one embodiment, user-selectable satisfaction indicator 250 is always displayed on display area 262 of the display screens 260 generated by the application or other software system. Of course, while the present discussion proceeds with respect to indicator 250 being constantly displayed on display 260, that need not be the case. Instead, indicator 250 may be displayed on only selected display screens, as desired by the developer of the software system. Constant display of indicator 250 is exemplary only.

Providing user-selectable satisfaction indicator 250 as constantly being displayed on the screens of the application can be done in any number of ways. For example, a program can be run to add code to desired pages of the application so that indicator 250 is displayed on all desired pages of an application. Alternatively, or in addition, the code can be added to only certain pages, for certain users, or users in a certain geographical area, or using any other criteria to determine when and under what circumstances indicator 250 is added to a display screen. In any case, the user-selectable satisfaction indicator 250 is illustratively displayed on the application display screens 260.

When the user wishes to provide user satisfaction information, the user simply clicks on one of the user elements 256 on indicator 250. In that case, user interface component 104 receives the user selection input indicative of user satisfaction and provides it to user satisfaction control component 102. User interface component 104 also illustratively records a variety of data which can be used later in generating reports. For instance, component 104 can record context data, time data, a unique user identification, and provide all of that information to component 102 for storing (along with the user satisfaction input by the user) in user satisfaction data store 108. Receiving the user selection input actuating one of elements 256 to indicate user satisfaction is indicated by block 202 in FIG. 2 and recording the various features of the user interface (such as context data, time data, PII-GUID data, etc.) is indicated by blocks 204, 206, and 208. Block 208 is shown in dashed line to indicate that it is optional. Of course, all of the different types of data are optional, and more types of data can be added in the recording process, as desired.

The context data may illustratively include data such as the market in which the application is being used (e.g., English speaking, Chinese speaking, etc.), a particular command that the user has just input (such as the text of a search query input on a search engine), the form code of the user interface display then being displayed by the application, the version number of the application being used, or any other features that describe the context that the user is currently in, when the user provides the user satisfaction input. Of course, the context information may also illustratively include the overall configuration of the display being provided to the user, such as background color, font size, the placement of user interface elements, etc.

The time data may illustratively include when the user's session with the application began, the particular time within the session that the user satisfaction input was provided, and it may also provide the time that the user's session ends, so that it can be determined whether the user's satisfaction input was provided towards the beginning or towards the end of the user's session. Of course, all of these items of information may be tracked by the application the user is using, and retrieved by user interface component 104, or they can be tracked by the operating system, or a combination of the two, or by other information tracking components in the computer system. In any case, the information is recorded in user satisfaction data store 108.

Figure 4:

After the user satisfaction measure and the data has been recorded, user satisfaction control component 102 can control user interface component 104 to generate a user selectable interface element 270 that allows a user to input additional information. For example, FIG. 4 shows one illustrative screenshot of such a user-selectable interface component 270. The component includes a text string such as "Thank you for your feedback, tell us tiny bit more", with the text "tell us a tiny bit more" being selectable by the user to cause a further interface element to be displayed.

If the user selects the "tell us a tiny bit more" link, then it is determined that the user wishes to provide additional user satisfaction information. Determining whether the user will provide additional feedback is indicated by block 210 in FIG. 2. If not, then user satisfaction control component 102 causes user interface component 104 to simply generate a "thank you" message, such as message 280 shown in FIG. 6. Generating the thank you message is indicated by block 212 in FIG. 2.

Figure 5:
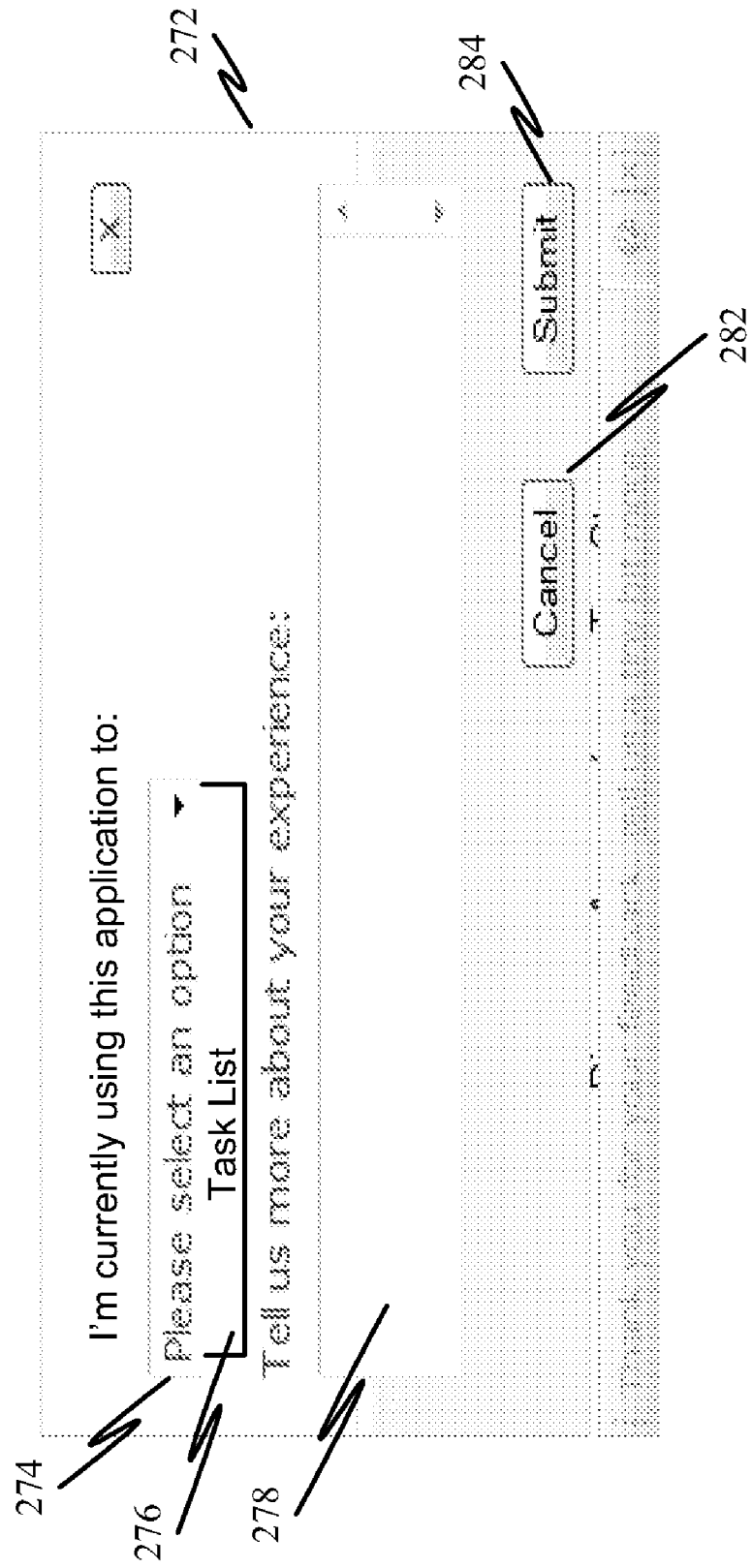

However, if, at block 210, the user agrees to provide additional information, then user satisfaction control component 102 causes user interface component 104 to generate another user selectable element 272, one example of which is shown in FIG. 5, that will allow the user to input additional information. The further information generated through element 272 will illustratively include task data that identifies the particular task that the user is attempting to perform. This allows system 100 to very clearly determine the intent of the user in using the application, at the time the user feedback is provided. In the embodiment shown in FIG. 5, element 272 illustratively includes a text string such as "I am currently using this application to:"

Immediately below the text string is placed a drop down box 274. When the user selects the drop down box, a drop down task list 276 is displayed which allows the user to select a task. For instance, when the application is a search application, the task might be "submit a query", "View results", "Modify query", etc.

The type of tasks may also illustratively include such things as "navigation" (where a user is looking for a site), "informational" (where a user is looking for a some information), "shopping", "getting a specific answer", or "none of the above".

In the embodiment shown in FIG. 5, element 272 also includes a text box 278 which allows a user to submit additional textual comments. Element 272 further includes a cancel button 282 which allows a user to cancel the additional user feedback option, and a submit button 284 that allows a user to submit the additional user satisfaction information generated through element 272. Generating the further information collection display 272 is indicated by block 212 in FIG. 2, and receiving the task data identifying the user's intent is indicated by block 214 in FIG. 2.

Once this information is received, user interface component 104 passes it to user satisfaction control component 102 which stores it in user satisfaction data store 108 for later report generation. Recording the task data is indicated by block 216 in FIG. 2.

Figure 6:
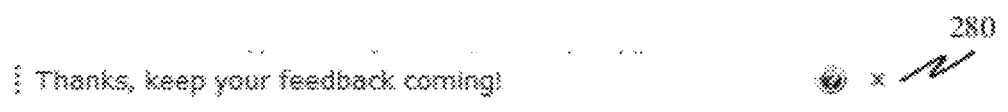

Again, once the user satisfaction input process is finished, the system illustratively generates the "thank you" display 280 shown in FIG. 6.

It will, of course, be understood that in one illustrative embodiment, all of the displays in FIGS. 3A, and 4-6, are provided in the user satisfaction display area 262 shown in FIG. 3B, so that the user satisfaction displays do not completely take over the application display area 260. Therefore, the user need not navigate away from the particular screen 260 where the user initiated the user satisfaction feedback process. This provides a much simpler and more efficient mechanism for a user to provide feedback then prior systems. In addition, the collection of the task data and other context data, time data and user identification data also make it much easier to correlate the user's satisfaction input to specific features of the user interface that the user is then using.

Figure 7:
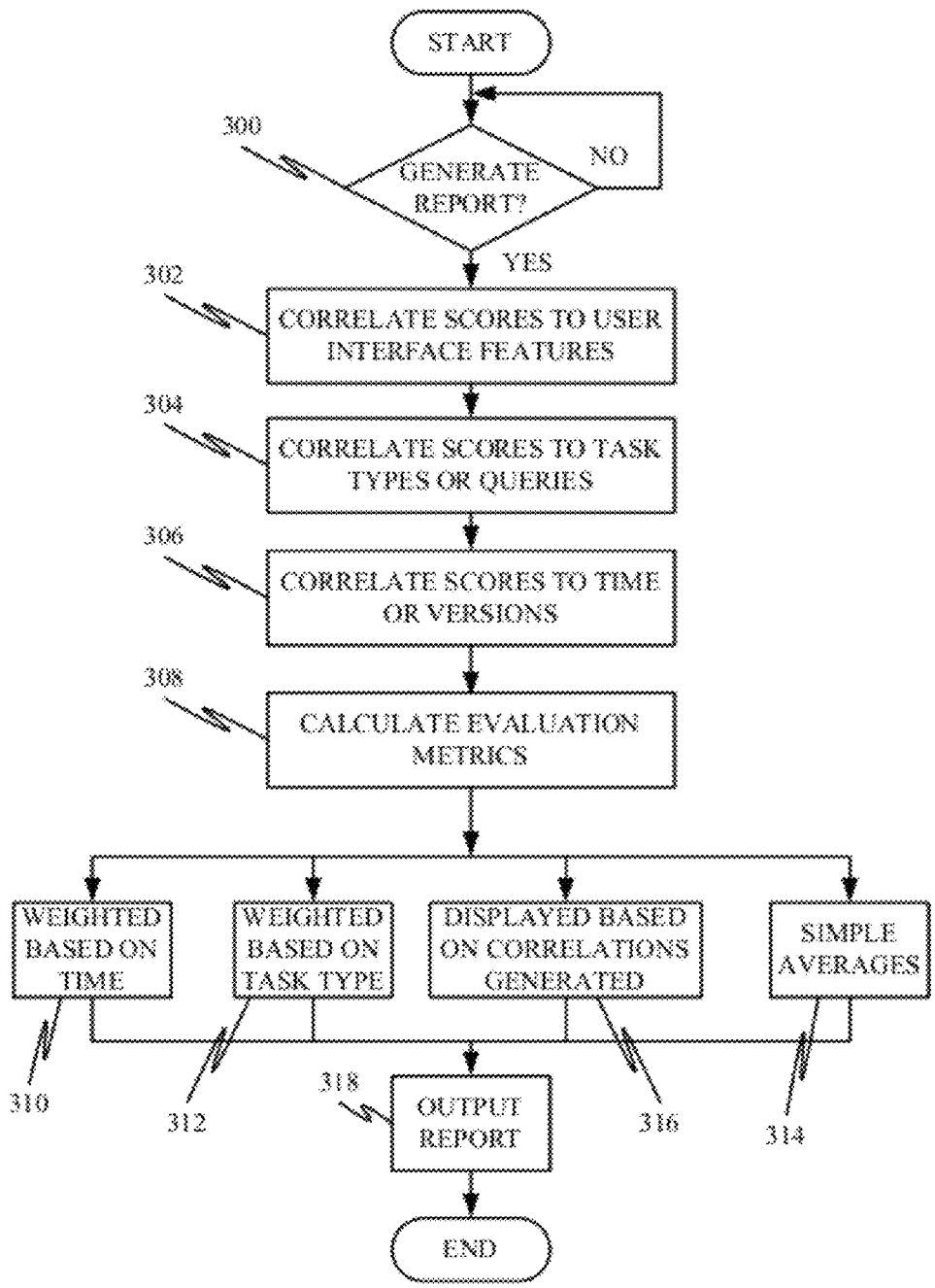
FIG. 7 is a flow diagram illustrating the overall operation of the system shown in FIG. 1 in generating user satisfaction reports.

FIG. 7 is a flow diagram illustrating one illustrative embodiment of the operation of system 100 in generating a report once sufficient user satisfaction data has been stored in data store 108. First, it is determined that an administrator or other user desires to generate a user satisfaction report for a given software system. This is indicated by block 300 in FIG. 7. When this happens, a variety of processing steps can take place, as desired by the person receiving the report. For instance, in one embodiment, a metric calculator 106 accesses the data in data store 108 and analyzes it to create the reports. Metric calculator 106 illustratively correlates user feedback scores indicated by the user feedback input received through element 250 to various features that were recorded. For instance, if the user inputs a high degree of satisfaction, that may illustratively be reduced to a numerical score when it stored in data store 108. Metric calculator 106 illustratively correlates that score to the various features of the user interface that were recorded at the time that the score was input by the user. For instance, metric calculator 106 may correlate the score to the various physical features of the interface, such as the color, the background color, the foreground color, the font, the font size, the placement of user interface elements on the screen, etc.

Similarly, where the user has provided additional information, in addition to the context data, the scores can be correlated to that information as well. Therefore, if a user has provided an input indicating the type of task that the user was attempting to perform when the user satisfaction input was received, metric calculator 106 can correlate the received score to that type of task. Further, metric calculator 106 can correlate the score to the time that the score was received, to the market from which the score was received, to an individual user that input the score, to a time within a given session (whether it was toward the beginning or end of the session) that the user input was received, etc. In addition, metric calculator 106 can correlate the score to a given version of an application that the user was using. A wide variety of other correlations can be made as well, and these are mentioned for exemplary purposes only. Correlating the score to the user interface features is indicated by block 302, correlating the scores to task types or queries is indicated by block 304, correlating the scores to a time or version of the software is indicated by block 306.

Once the desired correlations are made, metric calculator 106 illustratively calculates evaluation metrics for the report. Of course, a wide variety of different metrics can be used. For instance, metric calculator 106 may calculate simple averages for all user satisfaction inputs received on the application, and combine them to obtain an overall average for an application. Similarly, however, metric calculator 106 can refine the granularity so that the averages are computed for each form displayed (or for each display screen displayed when the user provided a user satisfaction input), by task type, by query or query type, by time of day, or by any other correlation criteria accessible by metric calculator 106.

Similarly, the averages may not be simple averages, but weighted averages. In other words, it is generally accepted that a user's first and last impressions are likely to be remembered by the user. Therefore, user satisfaction scores that were input into the system early in the user's session or late in the user's session can be weighted more heavily than those input toward the middle of a user's session. Also, some task types might be more important than others in the application, or might be used more often, and therefore, the scores can be weighted based on the type of task performed. Similarly, some contexts may have received a higher number of user satisfaction inputs than others. In that case, the scores for those contexts may be weighted more heavily than other scores for other contexts. Similarly, metric calculator 106 can calculate the metrics for any of a wide variety of other correlations. Calculating evaluation metrics is indicated by block 308 in FIG. 7, weighting them based on time is indicated by block 310, weighting them based on task type is indicated by block 312, calculating simple averages is indicated by block 314, and displaying the scores or metrics based on other correlations generated is indicated by block 316.

Once the metrics are calculated and correlated as desired, report generator 110 illustratively retrieves the information to generate report 114. Outputting the report is indicated by block 318 in FIG. 7.

Figure 8:
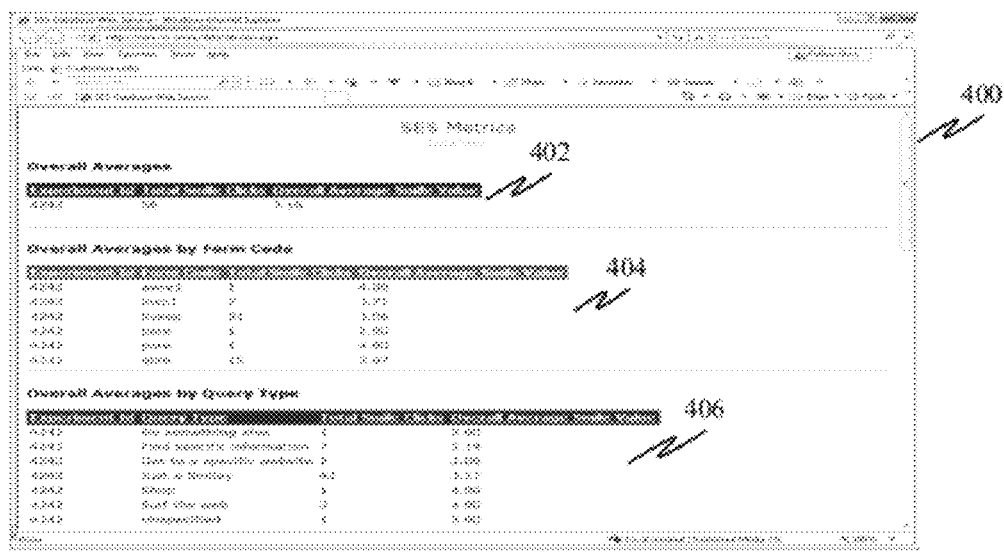
FIG. 8 is one illustrative screenshot showing a report as generated in FIG. 7.

FIG. 8 shows one exemplary screenshot of a report 400 generated using system 100 shown in FIG. 1. Report 400 has three sections. The first section 402 indicates the overall average user satisfaction score for a given software system. Section 402 includes an experiment identification section (which may identify a particular project or study for which the report is generated), a total number of user satisfaction inputs received, and an overall average score (in this case referred to as a "smile value") for those user satisfaction inputs. The exemplary report 400 also includes section 404 that includes overall averages by form code (by screenshot generated). The section includes an identification of the particular study or experiment being conducted, an identification of the individual form codes for which user satisfaction inputs will be received, the total number of user satisfaction inputs (smile clicks) received for each individual form code, and the overall smile value (or user satisfaction score) broken down by form code. Finally, report 400 includes section 406 that includes overall averages by query type.

In the embodiment shown in FIG. 8, the application is a search engine. Therefore, some of the additional task information input by the user is the type of query which was input (such as navigational, finding specific information, shopping, etc.). Section 406 again includes an identification of the experiment or study being conducted, an identification of the query type for which a user satisfaction input was received, the total number of user satisfaction inputs received for each query type, and the overall average score for each query type. Again, report 400 is illustrative only and a wide variety of different reports could be generated as well.

Figure 9:
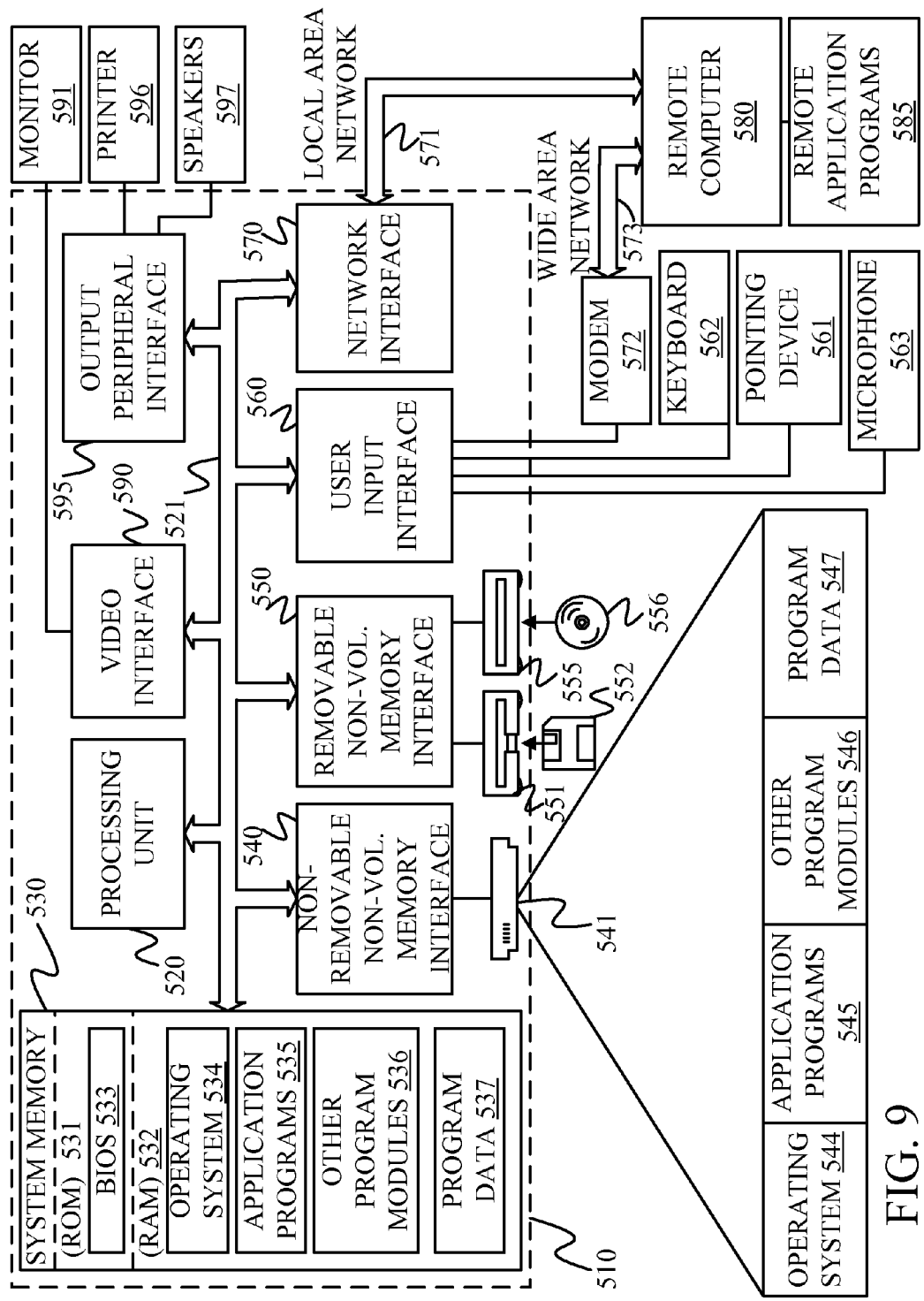
FIG. 9 is a block diagram of one illustrative computing environment.

FIG. 9 is one embodiment of a computing environment in which the invention can be used. With reference to FIG. 9, an exemplary system for implementing some embodiments includes a general-purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 9 illustrates operating system 534, application programs 535, other program modules 536, and program data 537.

The computer 510 may also include other removable/non-removable volatile/nonvolatile computer storage media. By way of example only, FIG. 9 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 9, provide storage of computer readable instructions, data structures, program modules and other data for the computer 510. In FIG. 9, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. They can also include the system 100 shown in FIG. 1. System 100 can be stored other places as well, including being stored remotely.

FIG. 9 shows the clustering system in other program modules 546. It should be noted, however, that it can reside elsewhere, including on a remote computer, or at other places.

A user may enter commands and information into the computer 510 through input devices such as a keyboard 562, a microphone 563, and a pointing device 561, such as a mouse, trackball or touch pad. Other input devices (not shown) may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 is operated in a networked environment using logical connections to one or more remote computers, such as a remote computer 580. The remote computer 580 may be a personal computer, a hand-held device, a server, a router, a network PC, a peer device or other common network node, and typically includes many or all of the elements described above relative to the computer 510. The logical connections depicted in FIG. 9 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 9 illustrates remote application programs 585 as residing on remote computer 580. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of calculating user satisfaction relative to a software system, the method comprising:
    displaying a user selectable satisfaction indicator on a selected portion of a plurality of different user interface screens, the user selectable satisfaction indicator including at least one user selectable element, selectable by a user to indicate one of a plurality of different user satisfaction levels;
    receiving a plurality of different user satisfaction inputs for the software system, each user satisfaction input indicative of a user selecting one of the user selectable elements;
    storing context information indicative of a context of the software system when each of the plurality of different user satisfaction inputs are received;
    calculating a user satisfaction metric based on the plurality of different user satisfaction inputs;
    generating a user interface display prompting a user for further user satisfaction information, wherein prompting comprises displaying a user selectable task indicator;
    receiving a user task input, separate from the user satisfaction inputs, indicative of the user selecting the user selectable task indicator identifying a task within the software system being performed by the user when one or more of the user satisfaction inputs were received; and
    correlating, using a computer processing unit, the user satisfaction metric to the context information and the identified task.

2. The method of claim 1 wherein displaying a user selectable satisfaction indicator on a selected portion of a plurality of different user interface screens comprises:
    displaying the user selectable satisfaction indicator on the selected portion, such that the selected portion is small relative to the different user interface screens.

3. The method of claim 1 wherein the user selectable satisfaction indicator includes a plurality of user selectable elements each indicative of a different user satisfaction level.

4. The method of claim 1 wherein the context information comprises user interface features describing a user interface screen being displayed when the user satisfaction input is received.

5. A user satisfaction system identifying a user satisfaction level for portions of a software system, the user satisfaction system, including a processor and a memory, comprising:
    a user interface component generating user interface display screens for the software system, the user interface display screens including a software system display and a user satisfaction display, displayed together with the software system display, and having selectable elements being selected by a user to indicate a user satisfaction level;
    a user satisfaction component receiving a user satisfaction input indicative of the user selecting one of the selectable elements and storing context features indicative of a plurality of specific user interface features of the software system display being displayed when the user satisfaction input is received;
    a metric calculator calculating a user satisfaction metric and correlating the user satisfaction metric with each of the plurality of specific user interface features of the software system displayed when the user satisfaction input was received; and
    an output component outputting the user satisfaction metric correlated with each of the software system display features.

6. The user satisfaction system of claim 5 wherein the context features include a time feature indicative of a time within a user session that the user satisfaction input was received, and wherein the metric calculator correlates the user satisfaction metric to the time feature.

7. The user satisfaction system of claim 5 wherein the user satisfaction component generates a prompt for receiving a user task input indicative of a task type being performed when the user satisfaction input was received, and wherein the metric calculator correlates the user satisfaction metric to the task type.

8. The user satisfaction system of claim 5 wherein the software system comprises a search application and wherein the context features include a text string indicative of a query input by a user when the user satisfaction input was received.

9. A method of identifying user satisfaction for a software system, the method comprising:
    displaying, on each of a plurality of different display screens generated by the software system, a plurality of different user selectable satisfaction elements, each user selectable satisfaction element being indicative of a user satisfaction level;
    receiving a plurality of satisfaction inputs each indicative of a selected user satisfaction level, wherein the plurality of satisfaction inputs comprises a satisfaction input received for each of the plurality of different display screens;
    in response to receiving each of the satisfaction inputs, storing a plurality of features indicative of context features of a respective one of the plurality of different display screens that was displayed at a time when the satisfaction input is received;
    calculating a metric based on the user satisfaction levels indicated by the plurality of satisfaction inputs received for the plurality of different display screens;
    correlating the metric to the plurality of features using a processing unit; and
    outputting a user satisfaction relative to each feature of the plurality of features based on correlations between the metric and the features.

10. The method of claim 9 wherein the user selectable satisfaction elements comprise actuable face icons, each indicating a different user satisfaction level.

11. The method of claim 9 and further comprising:
    in response to receiving each of the satisfaction inputs, generating a prompt display prompting for task information; and
    if the user enters the task information, storing the task information.

12. The method of claim 11 wherein generating a prompt display comprises:
    generating a drop down box with a list of selectable tasks;
    receiving a user input indicative of user selection of one of the selectable tasks in the list;
    receiving additional textual comments from the user; and
    wherein outputting a user satisfaction comprises outputting, to an application developer, the satisfaction inputs and additional textual information directly or through the metric.

13. The method of claim 12 and further comprising:
    correlating the metric to selected tasks.

14. The method of claim 9, wherein storing a plurality of features comprises:
   storing a text string indicative of a query input by a user into the respective one of the plurality of different display screens when the user satisfaction input was received.

15. The method of claim 9, and further comprising:
   receiving a drag and drop input indicative of a user repositioning the user selectable satisfaction elements on the display screens;
   repositioning the user selectable satisfaction elements based on the drag and drop input.

16. The user satisfaction system of claim 5, wherein the plurality of specific user interface features comprise physical user interface features of the software system.

17. The user satisfaction system of claim 16, wherein the physical user interface features comprise one or more of a font, a font size, a font color, a background color, a foreground color, and a placement of user interface elements on a display screen.

* * * * *